(12) United States Patent
Makino

(10) Patent No.: US 9,074,561 B2
(45) Date of Patent: Jul. 7, 2015

(54) FUEL VAPOR PROCESSING DEVICES

(75) Inventor: Katsuhiko Makino, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 510 days.

(21) Appl. No.: 13/446,419

(22) Filed: Apr. 13, 2012

(65) Prior Publication Data

US 2012/0260893 A1  Oct. 18, 2012

(30) Foreign Application Priority Data

Apr. 15, 2011  (JP) ................. 2011-090740

(51) Int. Cl.
*F02M 33/02* (2006.01)
*F02M 25/08* (2006.01)
*B60K 15/035* (2006.01)

(52) U.S. Cl.
CPC ... *F02M 25/0854* (2013.01); *F02M 2025/0881* (2013.01); *B01D 2259/4516* (2013.01); *B60K 2015/03514* (2013.01)

(58) Field of Classification Search
CPC .................. F02M 25/0854; F02M 2025/0881; F02M 2025/0845; B01D 2259/4516; B60K 2015/03514
USPC ......................... 123/516–521, 549
See application file for complete search history.

(56) References Cited

U.S. PATENT DOCUMENTS

| | | | |
|---|---|---|---|
| 4,070,828 A * | 1/1978 | Barres ............................ | 60/274 |
| 4,173,207 A * | 11/1979 | Hiramatsu ................... | 123/519 |
| 4,203,401 A * | 5/1980 | Kingsley et al. .............. | 123/520 |
| 4,308,840 A * | 1/1982 | Hiramatsu et al. ............ | 123/519 |
| 4,598,686 A * | 7/1986 | Lupoli et al. .................. | 123/519 |
| 4,721,846 A * | 1/1988 | Lupoli et al. .................. | 219/206 |
| 4,732,588 A * | 3/1988 | Covert et al. ................... | 96/144 |
| 4,778,495 A * | 10/1988 | Bishop et al. ................... | 96/141 |
| 4,846,135 A * | 7/1989 | Tiphaine ...................... | 123/520 |
| 4,864,103 A * | 9/1989 | Bishop et al. ................... | 96/141 |
| 4,986,840 A * | 1/1991 | Mori et al. ...................... | 96/137 |
| 5,173,095 A * | 12/1992 | Yasukawa et al. .............. | 96/122 |
| 5,207,808 A * | 5/1993 | Haruta et al. ................... | 96/131 |
| 5,337,721 A * | 8/1994 | Kasuya et al. ................ | 123/519 |

(Continued)

FOREIGN PATENT DOCUMENTS

| FR | 2744036 A1 * | 8/1997 | ............ B01D 53/04 |
|---|---|---|---|
| FR | 2890340 A1 * | 3/2007 | |

(Continued)

OTHER PUBLICATIONS

Japanese Office Action mailed Jul. 1, 2014, corresponding to Japanese Patent Application 2011-090740; with English Translation attached.

(Continued)

*Primary Examiner* — Mahmoud Gimie
*Assistant Examiner* — John Zaleskas
(74) *Attorney, Agent, or Firm* — Ladas & Parry LLP

(57) ABSTRACT

A fuel vapor processing device may include a casing having an adsorption chamber defined therein, an adsorption material disposed within the adsorption chamber, a heating device capable of heating the adsorption material, and a passage member communicating between the adsorption chamber and the atmosphere. The passage member defines a flow space facing to an outer circumferential surface of the casing, so that heat can be transmitted between the adsorption chamber and the flow space.

8 Claims, 7 Drawing Sheets

(56) References Cited

U.S. PATENT DOCUMENTS

| | | | | |
|---|---|---|---|---|
| 5,450,833 A * | 9/1995 | Denz et al. | | 123/520 |
| 5,456,236 A * | 10/1995 | Wakashiro et al. | | 123/519 |
| 5,460,136 A * | 10/1995 | Yamazaki et al. | | 123/519 |
| 5,564,398 A * | 10/1996 | Maeda et al. | | 123/520 |
| 5,632,251 A * | 5/1997 | Ishikawa | | 123/519 |
| 5,634,450 A * | 6/1997 | Hara et al. | | 123/519 |
| 5,861,050 A * | 1/1999 | Pittel et al. | | 95/115 |
| 6,098,601 A * | 8/2000 | Reddy | | 123/520 |
| 6,230,693 B1 * | 5/2001 | Meiller et al. | | 123/519 |
| 6,343,591 B1 * | 2/2002 | Hara et al. | | 123/519 |
| 6,503,301 B2 * | 1/2003 | Uchino et al. | | 96/132 |
| 6,695,896 B2 * | 2/2004 | Hara et al. | | 96/121 |
| 6,769,415 B2 * | 8/2004 | Reddy et al. | | 123/519 |
| 7,008,471 B2 * | 3/2006 | Koyama et al. | | 96/131 |
| 7,059,306 B2 * | 6/2006 | Reddy | | 123/518 |
| 7,323,041 B2 * | 1/2008 | Yoshida et al. | | 96/132 |
| 7,448,366 B2 * | 11/2008 | Potier et al. | | 123/519 |
| 7,543,574 B2 * | 6/2009 | Yamazaki et al. | | 123/519 |
| 7,909,919 B2 * | 3/2011 | Kosugi et al. | | 96/126 |
| 2001/0015134 A1 * | 8/2001 | Uchino et al. | | 96/130 |
| 2002/0148354 A1 * | 10/2002 | Amano et al. | | 96/112 |
| 2002/0162457 A1 * | 11/2002 | Hyodo et al. | | 96/109 |
| 2002/0174857 A1 * | 11/2002 | Reddy et al. | | 123/520 |
| 2003/0005912 A1 * | 1/2003 | Koyama et al. | | 123/520 |
| 2004/0094132 A1 * | 5/2004 | Fujimoto et al. | | 123/519 |
| 2005/0109327 A1 * | 5/2005 | Reddy | | 123/519 |
| 2005/0172938 A1 * | 8/2005 | Uchino et al. | | 123/519 |
| 2006/0065252 A1 * | 3/2006 | Meiller et al. | | 123/519 |
| 2006/0196480 A1 * | 9/2006 | Kosugi et al. | | 123/516 |
| 2007/0056954 A1 * | 3/2007 | Tennison et al. | | 219/461.1 |
| 2007/0113831 A1 * | 5/2007 | Hoke et al. | | 123/519 |
| 2007/0266997 A1 * | 11/2007 | Clontz et al. | | 123/519 |
| 2008/0184973 A1 * | 8/2008 | Yamazaki et al. | | 123/519 |
| 2009/0031996 A1 * | 2/2009 | Chung | | 123/518 |
| 2009/0320805 A1 * | 12/2009 | Lang et al. | | 123/518 |
| 2009/0320806 A1 * | 12/2009 | Lang et al. | | 123/519 |
| 2010/0126476 A1 * | 5/2010 | Hidano et al. | | 123/519 |
| 2011/0139129 A1 * | 6/2011 | Lang et al. | | 123/519 |
| 2011/0155107 A1 * | 6/2011 | Lin et al. | | 123/519 |
| 2011/0247592 A1 * | 10/2011 | Kim et al. | | 123/519 |
| 2012/0024158 A1 * | 2/2012 | Makino et al. | | 96/154 |

FOREIGN PATENT DOCUMENTS

| | | | | | |
|---|---|---|---|---|---|
| GB | 2329217 A | * | 3/1999 | | F02M 25/08 |
| JP | 56-008836 U | * | 1/1981 | | |
| JP | 59-007258 U | | 1/1984 | | |
| JP | 61-181864 U | * | 11/1986 | | |
| JP | 03-123969 U | * | 12/1991 | | |
| JP | 05-017152 U | * | 3/1993 | | |
| JP | 05-280435 | | 10/1993 | | |
| JP | 06147035 A | * | 5/1994 | | F02M 25/08 |
| JP | 07293365 A | * | 11/1995 | | F02M 25/08 |
| JP | 08042413 A | * | 2/1996 | | F02M 33/00 |
| JP | 08-338326 | | 12/1996 | | |
| JP | 2003-293866 | | 10/2003 | | |
| JP | 2003293866 A | * | 10/2003 | | |
| JP | 2003314384 A | * | 11/2003 | | |
| JP | 2004-068696 | | 3/2004 | | |
| JP | 2005-325707 A | | 11/2005 | | |
| JP | 2009074399 A | * | 4/2009 | | |
| JP | 2009-121357 A | | 6/2009 | | |

OTHER PUBLICATIONS

Japanese Office Action mailed Feb. 10, 2015, corresponding to Japanese Patent Application 2011-090740; with English Translation attached.

* cited by examiner

FUEL VAPOR PROCESSING DEVICES

This application claims priority to Japanese patent application serial number 2011-090740, the contents of which are incorporated herein by reference.

BACKGROUND OF THE INVENTION

Field of the Invention

Embodiments of the present invention relate to fuel vapor processing devices for processing fuel vapor that may be produced, for example, in internal combustion engine systems of vehicles, such as automobiles.

Canisters are known that can be used as fuel vapor processing devices. As disclosed in Japanese Laid-Open Patent Publication No. 2003-293866, known canisters include a casing defining therein an adsorption chamber, an adsorption material, such as activated carbon, disposed within the casing for adsorbing fuel vapor, and a heater for heating the adsorption material. The casing has a charge port for introduction of fuel vapor into the adsorption chamber, a purge port for purging fuel vapor from within the adsorption, and an atmospheric port for introducing purge air into the adsorption chamber. The heater may heat the adsorption material during desorption of the fuel vapor from the adsorption material, so that decrease in temperature of the adsorption material due to the endothermic reaction that may occur during desorption of fuel vapor can be inhibited.

However, in the case of the known canister, an outer wall surface of the casing defining the adsorption chamber is directly exposed to the atmosphere. Therefore, the heat of the heater that heats the adsorption material may be dissipated to the atmosphere from the outer wall surface of the casing. This may lower the heating efficiency of the adsorption material and may hinder the improvement in the desorption ability. In addition, in this kind of canister, it may be possible that the temperature of the adsorption material may be increased due to the exothermic reaction that may occur during adsorption of the fuel vapor, causing degradation in the adsorption ability.

Therefore, there has been a need in the art for a fuel vapor processing device that is improved in adsorption and desorption abilities.

SUMMARY OF THE INVENTION

One aspect according to the present teachings includes a fuel vapor processing device that may include a casing having an adsorption chamber defined therein. An adsorption material capable of absorbing fuel vapor and allowing desorption of fuel vapor may be disposed within the adsorption chamber. The fuel vapor processing device may further include a heating device capable of heating the adsorption material, and a passage member communicating between the adsorption chamber and the atmosphere. The passage member may define a flow space facing to an outer circumferential surface of the casing, so that heat can be transmitted between the adsorption chamber and the flow space.

DETAILED DESCRIPTION OF THE INVENTION

Figure 1:
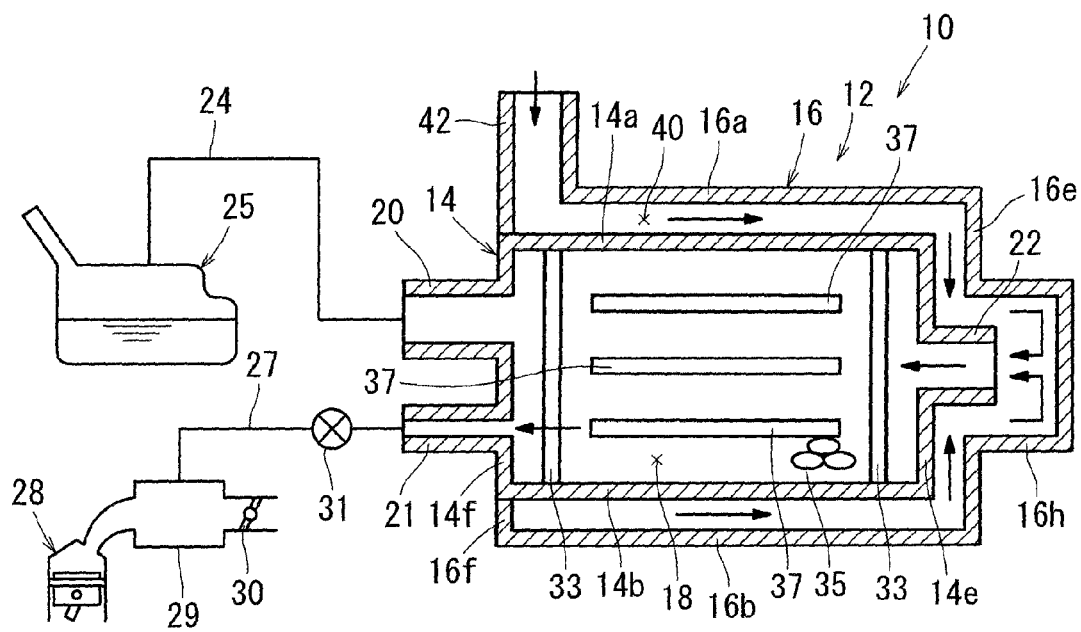
FIG. 1 is a view of a fuel vapor processing system including a canister according to a first example and showing the canister in a vertical sectional view as viewed from a right side.

Each of the additional features and teachings disclosed above and below may be utilized separately or in conjunction with other features and teachings to provide improved fuel vapor processing devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one example, a fuel vapor processing device may include a casing, an adsorption material, a heating device and an enclosure. The casing may have an adsorption chamber defined therein and may include a charge port for introducing a fuel vapor containing gas into the adsorption chamber, a purge port for purging fuel vapor from the adsorption chamber, and an atmospheric port for introducing purge air into the adsorption chamber. The adsorption material may be disposed within the adsorption chamber and may adsorb fuel vapor and allow desorption of fuel vapor. The heating device can heat the adsorption material. The enclosure may enclose at least a part of the casing that defines an outer wall of the adsorption chamber. A space may be defined between the enclosure and the at least a part of the casing. The space may allow the purge air to be introduced into the adsorption chamber after flowing through the space.

With this arrangement, during an adsorption process, fuel vapor introduced into the adsorption chamber via the charge port may be adsorbed by the adsorption material. On the other hand, during a desorption process, the purge air may be introduced into the adsorption chamber via the atmospheric port, so that fuel vapor adsorbed by the adsorption material may be desorbed. The desorbed fuel vapor may be purged from the purge port. During the desorption process, the heating device may heat the adsorption material to inhibit decrease in temperature of the adsorption material due to an endothermic reaction that may occur when the fuel vapor is desorbed. Therefore, the desorption ability of the fuel vapor processing device can be improved. In addition, the space is defined between the enclosure and the at least a part of the casing defining the outer wall of the casing. Therefore, as the purge air flows through the space, the purge air may absorb heat dissipated from the casing, so that the purge air is heated before entering the adsorption chamber. As a result, the heat dissipated from the casing can be effectively used for improving the efficiency of heating the adsorption material. Eventually, it is possible to inhibit decrease in temperature of the adsorption material during the desorption process, so that the desorption ability of the processing device can be improved.

On the other hand, during the adsorption process, the air within the adsorption chamber may flow through the space in a direction opposite to the direction of flow of the purge air before it is discharged to the atmosphere. The air flowing through the space may absorb the heat within the adsorption chamber, so that the adsorption chamber can be cooled. Hence, it is possible to inhibit increase in temperature of the adsorption material to eventually improve the adsorption ability of the processing device.

Improvements in the adsorption and desorption abilities may lead to decrease the amount of emission and to minimize the size of the processing device.

The heating device may include a heat generating element and a heat dissipating member. The heat generating element may be disposed within one of the adsorption chamber and the flow space. The heat dissipating member may be disposed within the other of the adsorption chamber and the flow space.

With this arrangement, during the desorption process, the heat generating element may heat the adsorption material while the heat dissipating member may heat the purge air. Alternatively, the heat generating element may heat the purge air while the heat dissipating member may heat the adsorption material.

The fuel vapor processing device may further include an activated carbon block having a honeycomb structure and disposed within the flow space. Alternatively, the activated carbon block may be disposed within a connecting member connected between the enclosure and the atmospheric port of the casing, so that the purge air flows through the connecting member after flowing through the flows pace of the enclosure. With this arrangement, the purge air heated by the heat dissipated from the casing may flow through the activated carbon block, so that fuel vapor can be efficiently desorbed from the activated carbon block. Therefore, it is possible to reduce the amount of fuel vapor that may be remained in the activated carbon block without being desorbed from the activated carbon block. As a result, it is possible to reduce the amount of flow of fuel vapor that may pass through the activated carbon block.

Representative examples will now be described with reference to the drawings. The representative examples relate to fuel vapor processing devices that are configured as canisters that may be mounted to automobiles or other vehicles having internal combustion engines.

A first representative example will now be described with reference to FIGS. 1 to 3. Referring to FIG. 1, there is shown a fuel vapor processing system incorporating a canister 10 that serves as a fuel vapor processing device. In the following explanation, the terms "upper side", "lower side", "left side" and "right side" are used to mean the upper side, the left side and the right side, respectively, as viewed in FIG. 2, and the terms "front side" and "rear side" are used to mean the right side and the left side, respectively, as viewed in FIG. 1.

Figure 2:
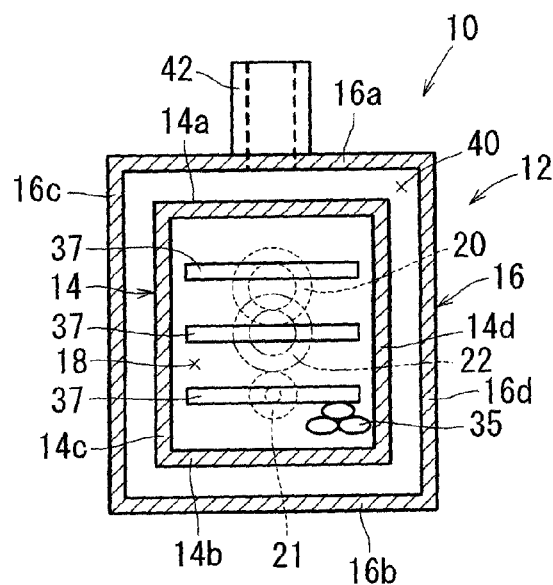
FIG. 2 is a vertical sectional view of the canister as viewed from a front side.
Figure 3:
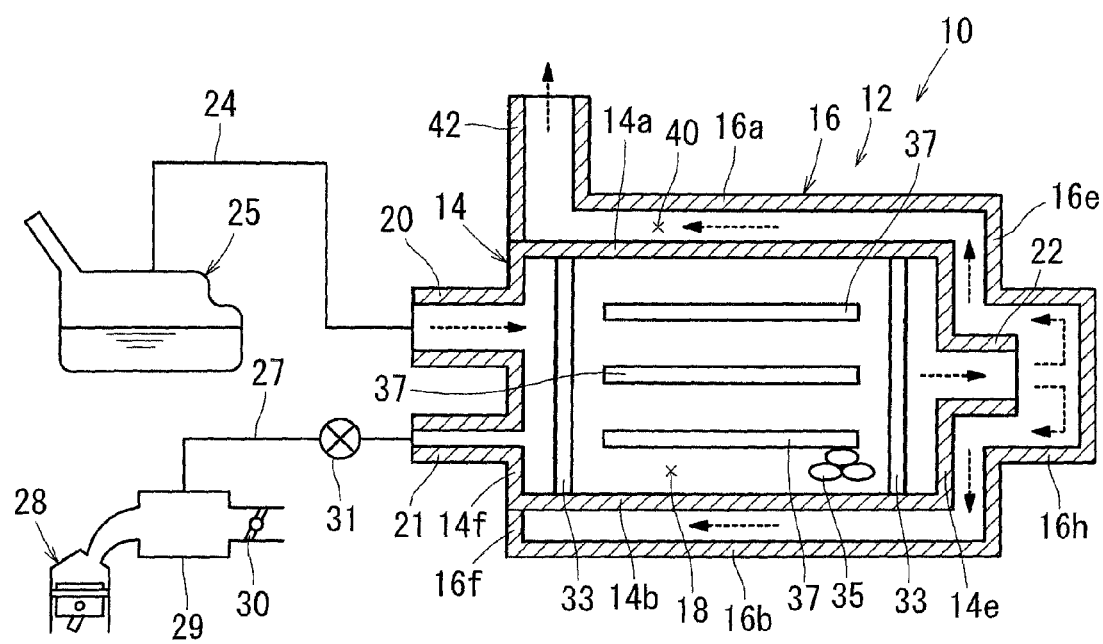
FIG. 3 is a view similar to FIG. 1 but showing a path of flow of air during an adsorption process.

Referring to FIGS. 1 and 2, the canister 10 includes a canister body 12 that may be made of resin. The canister body 12 includes a casing 14 and an enclosure 16 for enclosing the casing 14 from the outer side. The casing 14 may have a top plate 14a, a bottom plate 14b, a left side plate 14c, a right side plate 14d, a front end plate 14e and a rear end plate 14f. The casing 14 has a substantially rectangular parallelepiped box shape elongated in the forward and rearward direction (right and left direction as viewed in FIG. 1). Thus, the plates 14a to 14d define a rectangular tubular wall. However, the plates 14a to 14d may be replaced with a cylindrical tubular wall plate. An adsorption chamber 18 is defined within the casing 14. Therefore, in the following description, the plates 14a to 14d may be also called an outer wall of the adsorption chamber 18.

A tank port 20 and a purge port 21 are formed on the rear end plate 14f and are in communication with the adsorption chamber 18. The tank port 20 and the purge port 21 are arranged in line with each other in the vertical direction and extend rearwardly from the rear end plate 14f in parallel to each other. An atmospheric port 22 is formed on the central portion of the front end plate 14e and is in communication with the adsorption chamber 18. The atmospheric port 22 extends forwardly from the front end plate 14e. The tank port 20 is connected to a gaseous phase space within a fuel tank 25 via a fuel vapor passage 24. The tank port 20 may be also called as a "charge port 20." The purge port 21 is connected to an intake air pipe 29 of an internal combustion engine 28 via a purge passage 27. A throttle valve 30 may be provided within the intake air pipe 29 for controlling the flow of intake air that is supplied to the engine 28. The purge passage 27 is connected to the intake air pipe 29 at a position on the downstream side of the throttle valve 30. A purge valve 31 is disposed within the purge passage 27 in a midway of the purge passage 27. A control device known as an ECU (not shown) may control to open and close the purge valve 31. The atmospheric port 22 communicates with the atmosphere via a flow space 40 that will be explained later.

Front and rear filters 33 may be mounted within the adsorption chamber 18 at positions proximal to the front end plate 14e and the rear end plate 14f, respectively. Each of the filters 33 may be made of suitable material, such as non-woven resin fabric and urethane foam. An adsorption material 35 capable of adsorbing fuel vapor and allowing desorption of fuel vapor may be filled within a space defined between the filters 33 within the adsorption chamber 18. The adsorption material 35 may be in a form of granules. For example, activated carbon granules may be used as the adsorption material 35.

A plurality of heaters 37 each having a plate shape may be disposed within the adsorption chamber 18. The heaters 37 extend horizontally in parallel to each other and are spaced from each other by a given distance in the vertical direction. In this example, three heaters 37 are used. Each of the heaters 37 may have a heat generating element, such as a PTC element or a resistance heating element that may include nichrome wires. The heaters 37 are embedded within the adsorption material 35 that is filled within the adsorption chamber 18. When an electric power is supplied to the heaters 37, the heaters 37 may generate heat, so that the adsorption material 35 can be heated. A controller (not shown) may control the supply of electric power to the heaters 37. The heaters 37 may be called as "heat generating elements", "heating means" or "a heating device."

The enclosure 16 is configured to enclose the outer circumference and the front end of the casing 14 such that a space is formed between the enclosure 16 and the outer circumference of the casing 14 and also between the enclosure 16 and the front end of the casing 14. More specifically, the enclosure 16 has a top enclosure plate 16a, a bottom enclosure plate 16b, a left enclosure plate 16c, a right enclosure plate 16d, a front enclosure plate 16e and a rear enclosure plate 16f. The enclosure 16 has a substantially rectangular parallelepiped box shape elongated in the forward and rearward direction (the right and left direction as viewed in FIG. 1). Thus, the plates 16a to 16d define a rectangular tubular wall. However, the plates 16a to 16d may be replaced with a cylindrical tubular wall plate or other tubular wall structure.

The tubular wall defined by the plates 16a to 16d of the enclosure 16 is spaced from the tubular wall defined by the plates 14a to 14d of the casing 14 by a given distance, so that the tubular wall of the enclosure 16 and the tubular wall of the casing 14 may form a double tubular wall structure including an internal tubular wall and an external tubular wall. The front enclosure plate 16e is opposed to the front end plate 14e of the casing 14 such that the front enclosure plate 16e is spaced from the front end plate 14e by a given distance. Therefore, a flow space 40 is defined between the casing 14 and the enclosure 16. A tubular extension 16h is formed centrally of the front enclosure plate 16e and extends forwardly (rightward as viewed in FIG. 1) from the front enclosure plate 16e. The tubular extension 16h is opened at its rear end (left end as viewed in FIG. 1) and is closed at its front end. The tubular extension 16h serves to surround the atmospheric port 22 of the casing 14 such that the tubular extension 16h is spaced from the outer circumference and the open end of the atmospheric port 22 by a given distance. The rear enclosure plate 16f is formed to extend within the same plane as the rear end plate 14f of the casing 14. To this end, the rear enclosure plate 16f has a central opening, the inner circumference of which sealinglly contacts with or joined to the outer circumference of the rear end plate 14f.

As shown in FIG. 2, the flow space 40 defined between the casing 14 and the enclosure 16 includes a tubular space portion. The tubular space portion surrounds the entire outer circumference of the tubular wall portion of the casing 14 and is positioned on the outer circumferential side of the adsorption chamber 18 with an intervention of the tubular wall portion of the casing 14. The flow space 40 also includes a substantially rectangular space portion at the front end of the tubular space portion. The substantially rectangular space portion of the flow space 40 communicates with the adsorption chamber 18 via the atmospheric port 22. An atmospheric open port 42 is formed at the rear end of the top enclosure plate 16a, so that the flow space 40 is opened into the atmosphere via the atmospheric open port 42. The atmospheric open port 42 extends upward from the top enclosure plate 16a.

The operation of the fuel vapor processing system including the fuel vapor passage 24, the fuel tank 25, the purge passage 27, the intake air pipe 29 and the purge valve 31, etc., in addition to the canister 10 will now be described.

(Desorption Process (Purge Process))

During running of the internal combustion engine 28, the purge valve 31 may be opened, so that a negative pressure of the intake air may be applied to the adsorption chamber 18 of the canister 10. Therefore, the atmospheric air called as purge air may be introduced into the flow space 40 via the atmospheric open port 42 and flows forwardly (rightward in FIG. 1) within the flow space 40. The atmospheric air further flows into the adsorption chamber 18 via the atmospheric port 22, so that fuel vapor that may have been adsorbed by the adsorption material 35 can be desorbed. The fuel vapor desorbed from the adsorption material 35 may flow into the purge passage 27 and further into the intake air pipe 29 together with the air. Therefore, the desorbed fuel vapor is purged into the internal combustion engine 28 and may be burned in the internal combustion engine 28. Solid arrows in FIG. 1 indicate the flow path of the purge air.

During the purge process, an electric power may be supplied to the heaters 37, so that the heaters 37 generate heat that heats the adsorption material 35. Therefore, it is possible to inhibit reduction in temperature of the adsorption material 35 due to an endothermic reaction that may occur during desorption of fuel vapor. As a result, it is possible to improve the desorption ability. As the heaters 37 heat the adsorption material 35, the purge air flowing through the flow space 40 may be also heated due to recovery of heat transmitted from the casing 14 because the flow space 40 directly faces to the outer circumferential surface of the casing 14. Therefore, the purge air may enter the adsorption chamber 18 after having heated. Hence, the heat transmitted from the casing 14 can be effectively used for improving the efficiency of heating the adsorption material 35. As a result, it is possible to improved the desorption efficiency in addition to inhibition of reduction in temperature of the adsorption material 35 during desorption of fuel vapor.

(Adsorption Process)

If fuel is filled into the fuel tank 25 in the state where the operation of the internal combustion engine 28 is stopped, a fuel vapor gas that may be a mixture of air and fuel vapor produced in the fuel tank 25, etc., may be introduced into the adsorption chamber 18 via the fuel vapor passage 24. Therefore, the adsorption material 35 may adsorb the fuel vapor contained in the fuel vapor gas. As the adsorption material 35 adsorbs the fuel vapor, the temperature of the adsorption material 35 may be increased due to the exothermic reaction. In addition, as the fuel vapor gas is introduced into the adsorption chamber 18, the air contained in the adsorption chamber 18 may flow in the direction opposite to the flow of the purge air and may then be discharged to the atmosphere. Dotted arrows in FIG. 3 indicate the flow of air during the adsorption process. During the adsorption process, no electric power is supplied to the heaters 37, so that the heaters 37 may not heat the adsorption material 35.

As the air flows through the flow space 40, the air may absorb heat that may be transmitted from the adsorption chamber 18 via the casing 14. In other words, the adsorption chamber 18 is cooled. Therefore, increase of temperature of the adsorption material 35 can be inhibited, and hence the adsorption efficiency can be improved. For example, according a result of experiments performed by the applicant, the temperature of the air flowing through the flow space 40 was the same or substantially the same as the temperature of the atmospheric air, and therefore, the air flowing through the flow space 40 served as a cooling air for cooling the adsorption chamber 18. Further, even in the event that a breakthrough has occurred to the adsorption material 35, the adsorption chamber 18 can still be cooled because the temperature of the air flowing through the flow space 40 is lower than the temperature of the outer surface of the casing 14.

According to the canister 10 of this example, during the adsorption process, the adsorption material 35 may adsorb fuel vapor introduced into the adsorption chamber 18 via the tank port 20. On the other hand, during the desorption process, purge air may be introduced into the adsorption chamber 18 via the atmospheric port 22, so that fuel vapor can be desorbed from the adsorption material 35. The fuel vapor desorbed from the adsorption material 35 is thereafter discharged from the purge port 21. During the desorption process, the heaters 37 may heat the adsorption material 35.

Therefore, potential decrease in temperature of the adsorption material 35 due to the endothermic reaction can be inhibited, so that the desorption ability can be improved.

Incidentally, the flow space 40 substantially entirely surrounds the tubular wall portion of the casing 14 defining the outer wall of the adsorption chamber 18. Therefore, purge air flowing through the flow space 40 may be heated due to recovery of the heat transmitted from the casing 14 before introduction into the adsorption chamber 18. Hence, the heat transmitted from the casing 14 can be effectively used for improving the efficiency of heating the adsorption material 35. Eventually, it is possible to inhibit potential decrease in temperature of the adsorption material 35 during the desorption process, so that the desorption efficiency can be improved. On the other hand, during the adsorption process, the air contained in the adsorption chamber 18 may flow through the flow space 40 in a direction opposite to the flow direction of the purge air before it is discharged to the atmosphere. Therefore, the air flowing through the flow space 40 may absorb heat transmitted from the adsorption chamber 18, so that the adsorption chamber 18 may be cooled. Hence, potential increase in temperature of the adsorption material 35 can be inhibited, resulting in improvement of the desorption ability. In this way, during the desorption process, the efficiency of heating the adsorption material 35 can be improved by effectively utilizing the heat that may be transmitted from the casing 14 as the heaters 37 heat the adsorption material 35. On the other hand, during the adsorption process, potential increase in temperature of the adsorption material 35 can be inhibited to improve the adsorption ability. Improvements in the desorption and adsorption abilities may lead to reduction in emission and also reduction in size of the system.

Second to fifth examples will now be described with reference to FIGS. 4 to 12. These examples are modifications of the first example. Therefore, in FIGS. 4 to 12, like members are given the same reference numerals as the first example and the description of these members will not be repeated.

Second Example

Figure 4:
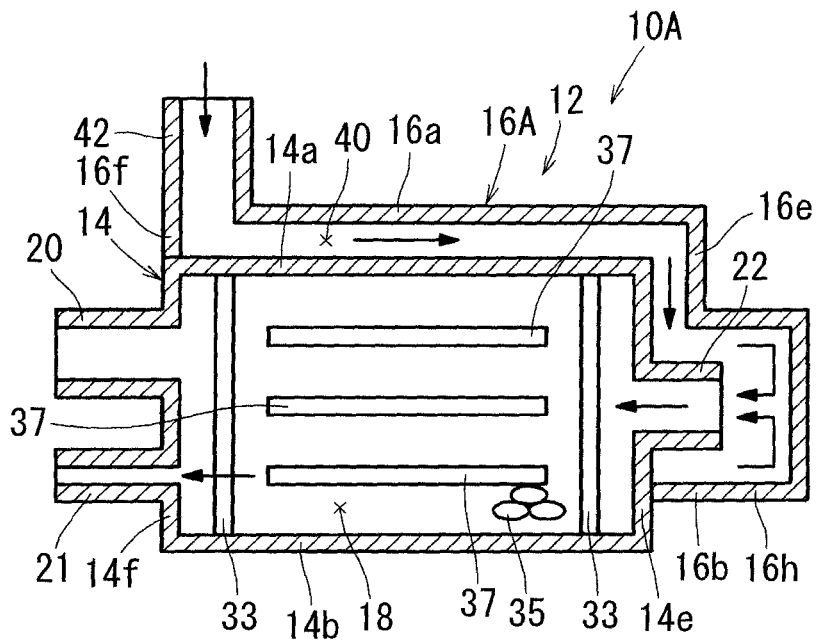
FIG. 4 is a vertical sectional view as viewed from a right side of a canister according to a second example.
Figure 5:
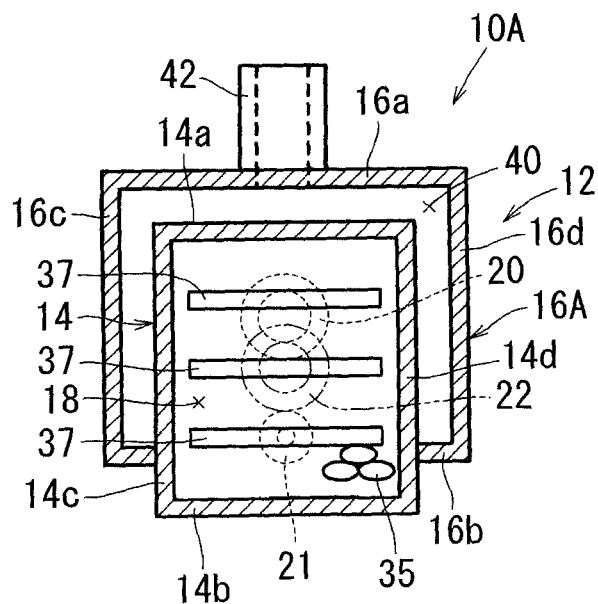
FIG. 5 is a vertical sectional view of the canister of FIG. 4 as viewed from a front side.
Figure 6:
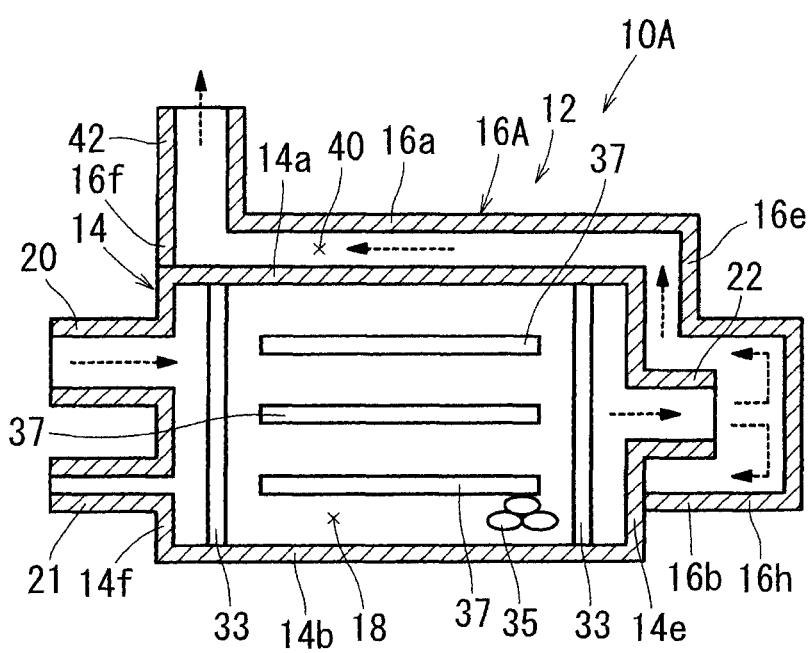
FIG. 6 is a view similar to FIG. 4 but showing a path of flow of air during an adsorption process.

Referring to FIGS. 4 to 6, a canister 10A according to a second example is different from the canister 10 of the first example in that the enclosure 16 (see FIGS. 1 and 2) is replaced with an enclosure 16A that enclose the outer tubular wall of the casing 14 except for its bottom. Thus, the bottom enclosure plate 16b is formed not to cover the bottom plate 14b of the casing 14, so that the bottom plate 14b is directly exposed to the outside. For this reason, the bottom enclosure plate 16b extends in continuity with the lower portion of the tubular extension 16h at the same level therewith (see FIG. 4). Therefore, the tubular space portion of the flow space 40 has a substantially inverted U-shape in a vertical sectional view and partially surrounds the outer tubular wall of the adsorption chamber 18 defined by the casing 14 (see FIG. 5). Solid arrows in FIG. 4 indicate a path of flow of purge air. Dotted arrows in FIG. 6 indicate a path of flow of air during the adsorption process.

Third Example

Figure 7:
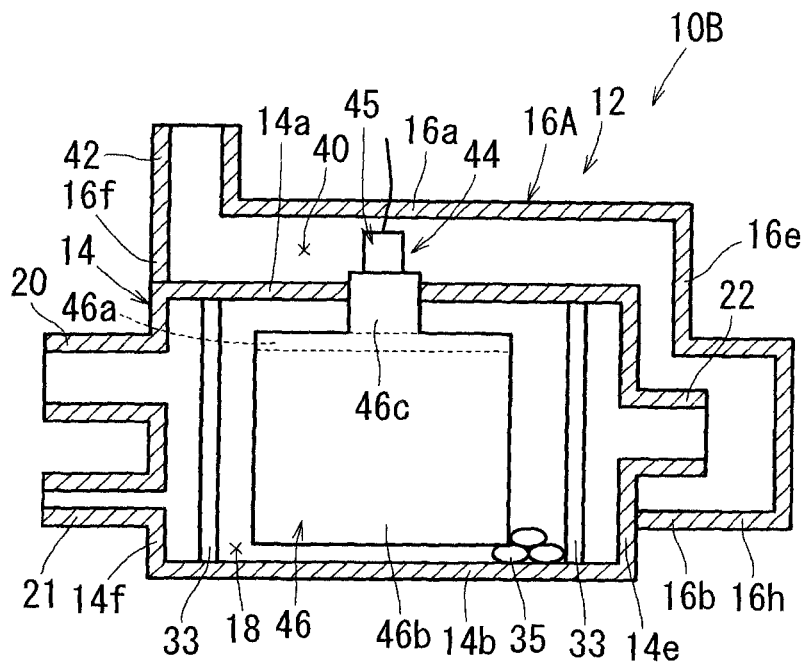
FIG. 7 is a vertical sectional view as viewed from a right side of a canister according to a third example.
Figure 8:
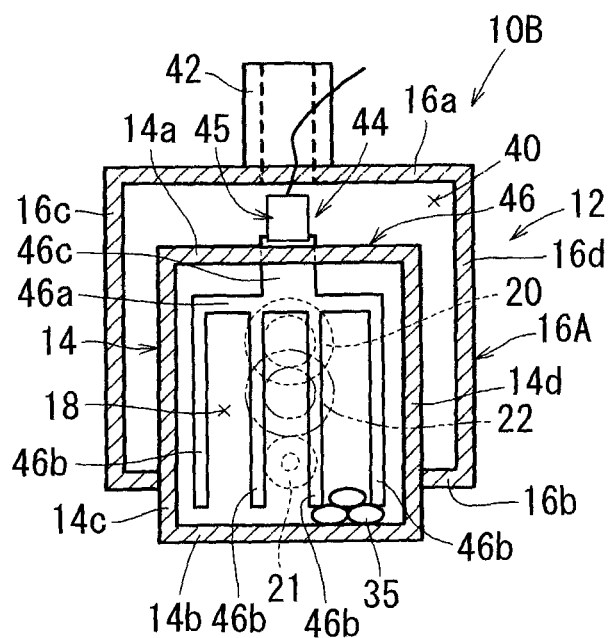
FIG. 8 is a vertical sectional view of the canister of FIG. 7 as viewed from a front side.

Referring to FIGS. 7 and 8, a canister 10B according to a third example is a modification of the canister 10A of the second example and is different from the canister 10A in that the heaters 24 (see FIGS. 4 and 5) are replaced with a single heating device 44. The heating device 44 includes a heater 45 and a heat sink 46 joined to the heater 45. The heater 45 serves as a heat source. The heat sink 46 serves as a heat dissipating member for dissipating heat. Thus, the heat of the heater 45 may be transmitted to the heat sink 46 and may then be dissipated from the heat sink 46.

The heat sink 46 is disposed within the adsorption chamber 18 and may be made of material having good heat conductivity, such as aluminum. The heat sink 46 has a horizontal base plate 46a and a plurality of fins 46b extending vertically from the base plate 46a. In this example, three fins 46b are provided and extend parallel to each other and are spaced from each other in the horizontal direction by a given distance (see FIG. 8). A rod-like mount portion 46c protrudes upward from the central portion of the base plate 46a and extends into the flow space 40 through the top plate 14a of the casing 14. Therefore, the heat sink 46 extends between the adsorption chamber 18 and the flow space 40 through the top plate 14a. The base plate 46a and the fins 46b of the heat sink 46 may contact the adsorption material 35 filled into the adsorption chamber 18. The heater 45 has a configuration like a block and is positioned within the space 40 so as to be placed on the mount portion 46c of the heat sink 46. The heater 45 may be a PTC element or a resistance heating element, such as nichrome wires.

With the canister 10B of the third example, the heater 45 positioned within the flow space 40 can heat the purge air during the desorption process. On the other hand, the heat sink 46 disposed within the adsorption chamber 18 can heat the adsorption material 35.

In addition, because the heat sink 46 is provided to extend between the adsorption chamber 18 and the flow space 40, the heat within the adsorption chamber 18 may be transmitted to the flow space 40 via the heat sink 46 and may then be absorbed by the air flowing through the flow space 40 during the adsorption process. Therefore, the adsorption chamber 18 can be effectively cooled for the adsorption process.

As an alternative arrangement, positions of the heater 45 and the heat sink 46 may be reversed such that the heater 45 is disposed within the adsorption chamber 18 and the heat sink 46 is positioned within the flow space 40. According to this arrangement, the heater 45 can heat the adsorption material 35 within the adsorption chamber 18 and the heat sink 46 can heat the purge air flowing through the flow space 40. In this way, the arrangement of the heater 45 and the heat sink 46 as well as their shapes can be suitably changed.

Fourth Example

Figure 9:
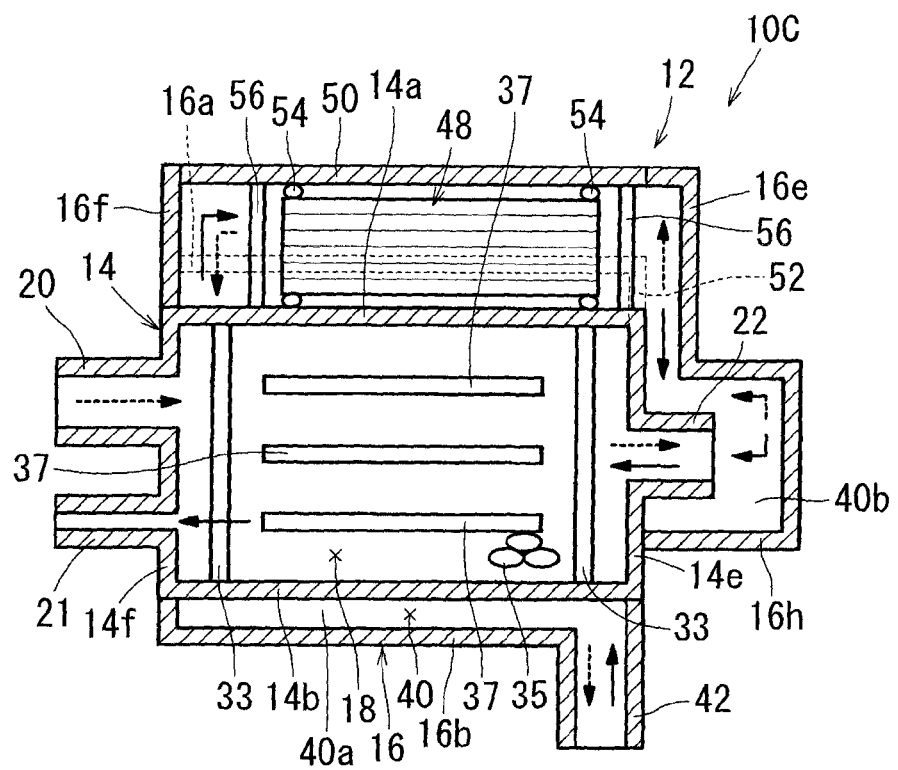
FIG. 9 is a vertical sectional view as viewed from a right side of a canister according to a fourth example.
Figure 10:
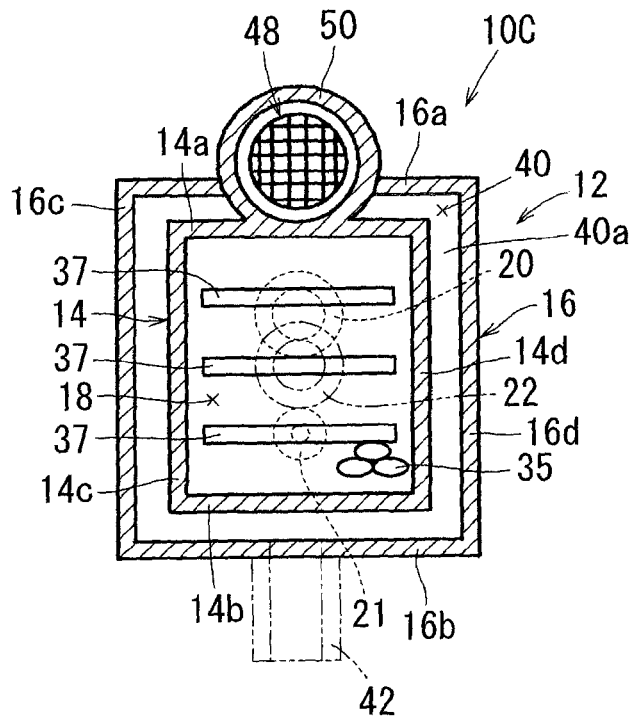
FIG. 10 is a vertical sectional view of the canister of FIG. 9 as viewed from a front side.

Referring to FIGS. 9 and 10, a canister 10C according to a fourth example is a modification of the first example and is different from the canister 10 of the first example in that an activated carbon block 48 having a honeycomb structure is disposed within a part of the flow space 40. More specifically, in order to store the activated carbon block 48, a cylindrical tubular portion 50 is formed on the top plate 14a of the casing 14. The cylindrical tubular portion 50 has front and rear openings and has a longitudinal axis extending in the forward and rearward direction (the right and left direction as viewed in FIG. 9). The bottom of the cylindrical tubular portion 50 is integrated with the upper surface of the top plate 14a. The upper part of the cylindrical tubular portion 50 is joined to the upper enclosure plate 16a of the enclosure 16 so as to extend upward through the upper enclosure plate 15a (see FIG. 10).

As shown in FIG. 9, the upper end of the front enclosure plate 16e of the enclosure 16 extends upward to be opposed to the front opening of the cylindrical tubular portion 50. The lower end of the front enclosure plate 16e is joined to the front end plate 14e of the casing 14 at the lower end of the tubular extension 16*h*. The upper end of the rear enclosure plate 16*f* also extends upward to be opposed to the rear opening of the cylindrical tubular portion 50. A partition wall 52 is formed within the flow space 40 and extends within the same plane as the front end plate 14*e* of the casing 14, so that the flow space 40 is divided into a front portion and a rear portion by the partition wall 52. With this arrangement, the front portion and the rear portion of the flow space 40 communicate with each other via the internal space of the cylindrical tubular portion 50. The main portion (the rear portion) of the flow space 40 will be hereinafter called as a main space portion 40*a*. The front portion of the space 40 communicating between the space within the cylindrical tubular portion 50 and the atmospheric port 22 will be hereinafter called as a fluid passage 40*b*. In addition, in this example, the atmospheric open port 42 is not formed on the upper enclosure plate 16*a* of the enclosure 16 (see FIG. 1) but is formed on the front end portion of the lower enclosure plate 16*b*. The atmospheric open port 42 extends downward from the lower enclosure plate 16*b*.

The activated carbon block 48 has a cylindrical shape and has a plurality of through-holes extending in an axial direction (the left and right direction as viewed in FIG. 9) for allowing air to flow therethrough. The activated carbon block 48 may be inserted into the cylindrical tubular portion 50 and may be molded from a mixture of activated carbon powder and a binder to have a honeycomb structure called a "monolith structure" capable of adsorbing fuel vapor and allowing desorption of fuel vapor. The activated carbon block 48 having a honeycomb structure may be also called as a honeycomb adsorption block.

The front and rear ends of the activated carbon block 48 may be supported within the cylindrical tubular portion 50 via front and rear seal members 54 that may be O-rings. Therefore, at the front and rear ends of the activated carbon block 48, the front and rear seal members 54 may seal a gap formed between the inner circumferential wall of the cylindrical tubular portion 50 and the outer circumference of the activated carbon block 48. Front and rear filters 56 are mounted within the cylindrical tubular portion 50 at positions opposed to the front and rear ends of the activated carbon block 48, respectively. Each of the filters 56 may be made of non-woven fabric or urethane foam.

With the canister 10C of this example, during the desorption process, the purge air may be introduced into the main space portion 40*a* of the flow space 40 to flow rearward (leftward as viewed in FIG. 9) therethrough. The purge air may then flow within the cylindrical tubular portion 50 through the activated carbon block 48 in a direction from the rear end to the front end of the activated carbon block 48 (rightward as viewed in FIG. 9). Thereafter, the purge air may flow through the fluid passage 40*b* of the flow space 40 and may then be introduced into the adsorption chamber 18 via the atmospheric port 22. Solid arrows in FIG. 9 indicate a path of flow of the purge air.

During the absorption process, the air within the adsorption chamber 18 may flow through the flow space 40 in the direction opposite to the flow of the purge air. Dotted arrows in FIG. 9 indicate a path of flow of air during the absorption process. During this process, the activated carbon block 48 may adsorb the fuel vapor that has not been adsorbed by the adsorption material 35. In addition, the air flowing through the activated carbon block 48 may absorb heat of the activated carbon block 48, so that the activated carbon block 48 may be cooled. Therefore, potential increase in temperature of the activated carbon block 48 may be inhibited, so that the adsorption ability can be improved.

During the desorption process, the purge air heated by absorbing heat transmitted from the casing 14 may flow through the activated carbon block 48, so that the fuel vapor can be efficiently desorbed from the activated carbon block 48. Therefore, it is possible to reduce the residual amount of the fuel vapor that has not been desorbed but remained in the activated carbon block 48.

In addition, the activated carbon block 48 is disposed within the cylindrical tubular portion 50 proximal to the outer tubular wall of the adsorption chamber 18 of the casing 14. Therefore, the heat of the casing 14 may be easily transmitted to the cylindrical tubular portion 50, so that that activated carbon block 48 can be efficiently heated. Hence, it is possible to inhibit potential reduction in temperature of the activated carbon block 48 during the desorption process, so that the desorption ability can be further improved.

Fifth Example

A fifth example will now be described with reference to FIGS. 11 and 12. The fifth example is a modification of the first example. A canister 10D of the fifth example is different from the canister 10 of the first example in that an activated carbon block 48D is disposed within an air passage 58 that communicates between the flow space 40 and the atmospheric port 22. The configuration and the material of the activated carbon block 48D may be the same as those of the activated carbon block 48 of the fourth example.

Similar to the fourth example (see FIG. 9), the atmospheric open port 42 is formed on the front end portion of the lower enclosure plate 16*b*. A connection port 60 is formed at a position where the atmospheric open port 42 is formed in the case of the canister 10 of the first example (see FIG. 1). The front enclosure plate 16*e* of the enclosure 16 is configured to extend within the same plane as the front end plate 14*e* of the casing 14, so that the flow space 40 is closed at the front enclosure plate 16*e*.

A cylindrical tubular member 62 having an axis extending in the forward and rearward direction is connected to the enclosure 16. The cylindrical tubular member 62 has a front connection port 63 and a rear connection port 64 that protrude in opposite directions from the cylindrical tubular member 62. The front connection port 63 is connected to the atmospheric port 22 via a front connection pipe 66. The rear connection port 63 is connected to the connection port 60 of the enclosure 16 via a rear connection pipe 68. Within the cylindrical tubular member 62, front and rear seal members 54D similar to the seal members 54 of the fourth example and front and rear filters 56D similar to the filters 56 of the fourth example are disposed in addition to the activated carbon block 54D. The cylindrical tubular member 62 and the connection pipes 66 and 68 serve as an air passage 58.

Figure 11:
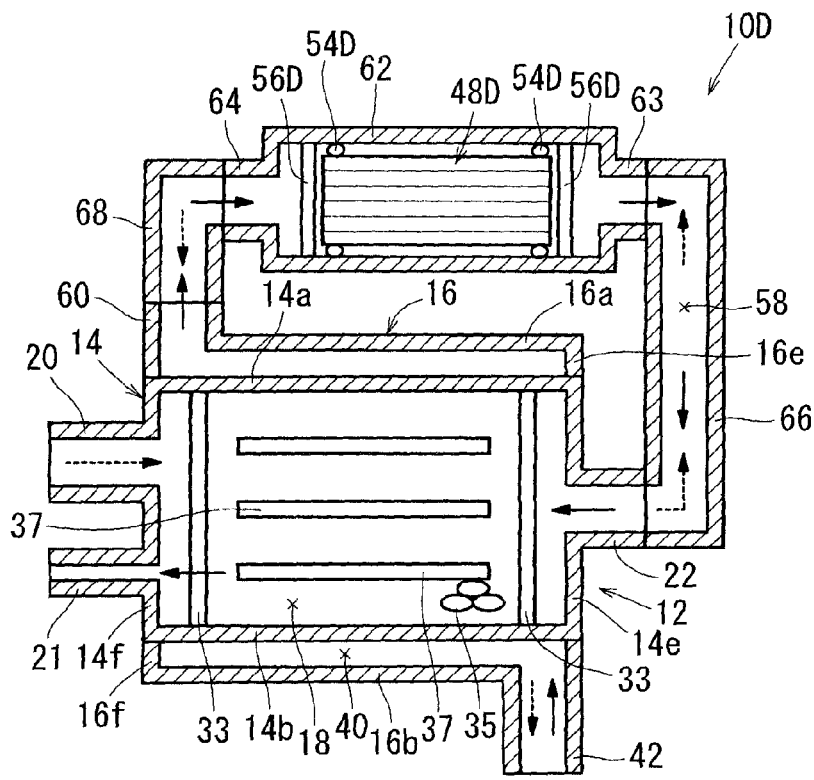
FIG. 11 is a vertical sectional view as viewed from a right side of a canister according to a fifth example.
Figure 12:
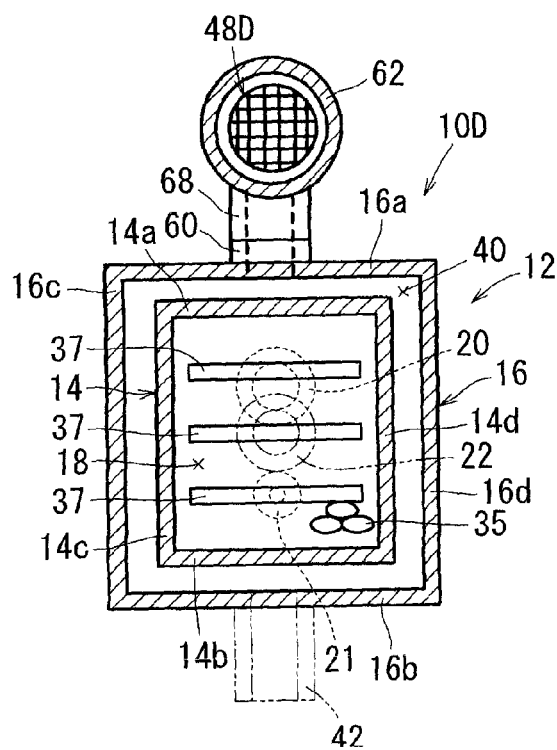
FIG. 12 is a vertical sectional view of the canister of FIG. 11 as viewed from a front side.

With the canister 10D of the fifth example, during the desorption process, the purge air may be introduced into the flow space 40 via the atmospheric open port 42 and may then flow through the flow space 40 in the rearward direction (leftward as viewed in FIG. 11). The purge air may further flow into the rear connection pipe 68 and may flow within the cylindrical tubular portion 62 through the activated carbon block 48D in a direction from its rear end to its front end (rightward as viewed in FIG. 11). The purge air may thereafter flow into the front connection pipe 66 and further into the adsorption chamber 18 via the atmospheric port 22. Solid arrows in FIG. 11 indicate a path of flow of the purge air.

During the adsorption process, the air within the adsorption chamber 18 may flow through the flow space 40 in a direction opposite to the direction of flow of the purge air and may then be discharged to the atmosphere. Dotted arrows in FIG. 11 indicate a path of flow of air during the adsorption process. During this process, the activated carbon block 48D may adsorb the fuel vapor that has not been adsorbed by the adsorption material 35 disposed within the adsorption chamber 18. Further, the air flowing through the activated carbon block 48D may absorb the heat of the activated carbon block 48D, so that the activated carbon block 48D may be cooled. Therefore, it is possible to inhibit potential increase in temperature of the activated carbon block 48 and to eventually improve the adsorption ability.

During the adsorption process, the purge air heated due to absorption of the heat transmitted from the casing 14 may flow through the activated carbon block 48D. Therefore, it is possible to efficiently desorb the fuel vapor from the activated carbon block 48D. As a result, it is possible to reduce the amount of fuel vapor that may be remained in the activated carbon block 48D without being desorbed. Consequently, it is possible to reduce the amount of flow of fuel vapor that may pass through the activated carbon block 48D.

The above first to fifth examples may be modified in various ways. For example, although the canisters 10 and 10A to 10D of above examples are configured to have a single adsorption chamber 18, the above teachings can also be applied to a canister having two or more adsorption chambers or adsorption material layers. Further, although the tank port (charge port) 20 and the purge port 21 of the casing 14 are positioned on the side opposite to the side of the atmospheric port 22, the above teachings can also be applied to a canister in which a tank port, a purge port and an atmospheric port are positioned on the same side of a casing and a U-shaped flow path of fluid is defined in the casing.

This invention claims:

1. A fuel vapor processing device comprising:
a casing having an adsorption chamber defined therein and including a charge port for introducing a fuel vapor containing gas into the adsorption chamber, a purge port for purging fuel vapor from the adsorption chamber, and an atmospheric port for introducing purge air into the adsorption chamber;
wherein the casing includes an intermediate portion extending along an axial direction, and a first end portion and a second end portion disposed on opposite sides of the intermediate portion with respect to the axial direction; and
wherein the atmospheric port is disposed at the first end portion of the casing;
an adsorption material disposed within the adsorption chamber and capable of absorbing fuel vapor and allowing desorption of fuel vapor;
a heating device capable of heating the adsorption material; and
an enclosure enclosing at least a part of the casing defining an outer wall of the adsorption chamber, the enclosure including an atmospheric open port;
wherein a flow space is defined between the enclosure and the at least a part of the casing; and
wherein the flow space is configured to allow the purge air to be introduced into the adsorption chamber via the atmospheric port after flowing through the flow space via the atmospheric open port;
wherein the enclosure further includes a first enclosure portion and a second enclosure portion;
wherein the flow space includes a first flow space and a second flow space;
wherein the first flow space is defined between the first enclosure portion and the intermediate portion of the casing and extends in the axial direction over an entire length of the intermediate portion of the casing, the first flow space including an upstream end and a downstream end with respect to the flow of the purge air;
wherein the second flow space is defined between the second enclosure portion and the first end portion including the atmospheric port of the casing and communicates with the downstream end of the first flow space, so that the atmospheric port communicates with the first flow space via the second flow space; and
wherein the atmospheric open port communicates with the upstream end of the first flow space, so that air serving as the purge air flows from an outside into the first flow space via the atmospheric open port, flows into the second flow space after flowing through the first flow space in the axial direction, and is introduced from the second flow space into the adsorption chamber via the atmospheric port;
wherein the heating device comprises a heat generating element and a heat dissipating member, the heat generating element is disposed within the flow space, and the heat dissipating member is connected to the heat generating element and being disposed to extend from the flow space into the adsorption chamber; and
wherein the heat dissipating member is covered with the adsorption material disposed within the adsorption chamber.

2. The fuel vapor processing device as in claim 1, further comprising an activated carbon block having a honeycomb structure and disposed within the flow space.

3. The fuel vapor processing device as in claim 1, further comprising:
an activated carbon block having a honeycomb structure; and
a communication member connected between the enclosure and the atmospheric port of the casing, so that the purge air flows through the communication member after flowing through the flow space of the enclosure; and
wherein the activated carbon block is disposed within the communication member.

4. The fuel vapor processing device as in claim 1, wherein the casing has a circumferential length, and the first flow space has a circumferential length extending along the entire circumferential length of the intermediate portion of the casing.

5. The fuel vapor processing device as in claim 1, wherein the heat dissipating member is a heat sink, and the heat sink extends across a wall portion of the casing between the flow space of the casing and the adsorption chamber.

6. The fuel vapor processing apparatus as in claim 1, wherein the atmospheric open port is disposed at one end of the first enclosure portion on a side opposite to the second enclosure portion.

7. The fuel vapor processing apparatus as in claim 1, wherein the heating device is disposed within the adsorption chamber so as to directly heat the adsorption material.

8. The fuel vapor processing apparatus as in claim 1, wherein no adsorption material is disposed within the flow space.

\* \* \* \* \*